US007801952B2

(12) United States Patent
Chen et al.

(10) Patent No.: US 7,801,952 B2
(45) Date of Patent: *Sep. 21, 2010

(54) HANDLING FAILED CLIENT RESPONSES TO SERVER-SIDE CHALLENGES

(75) Inventors: Ling Tony Chen, Belleview, WA (US); Michael Courage, Kirkland, WA (US); Dinarte Morais, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

This patent is subject to a terminal disclaimer.

(21) Appl. No.: 11/876,488

(22) Filed: Oct. 22, 2007

(65) Prior Publication Data

US 2008/0039209 A1 Feb. 14, 2008

Related U.S. Application Data

(63) Continuation of application No. 10/293,228, filed on Nov. 9, 2002, now Pat. No. 7,287,052.

(51) Int. Cl.
*G06F 15/16* (2006.01)

(52) U.S. Cl. ...................................... 709/203; 709/219
(58) Field of Classification Search ................. 709/201, 709/203, 219
See application file for complete search history.

(56) References Cited

U.S. PATENT DOCUMENTS

| 5,970,143 | A | 10/1999 | Schneier |
| 6,330,588 | B1 | 12/2001 | Freeman |
| 2002/0133575 | A1 | 9/2002 | Cidon |
| 2002/0144131 | A1 | 10/2002 | Spacey |

2006/0100010 A1* 5/2006 Gatto et al. ................... 463/29

FOREIGN PATENT DOCUMENTS

| WO | WO 02/056133 | 7/2002 |
| WO | WO 02/065258 | 8/2002 |

OTHER PUBLICATIONS

Office Action mailed Mar. 3, 2006 cited in related U.S. Appl. No. 10/293,228.
Office Action mailed Aug. 17, 2006 cited in related U.S. Appl. No. 10/293,228.
Office Action mailed Dec. 14, 2006 cited in related U.S. Appl. No. 10/293,228.
Notice of Allowance mailed Jul. 19, 2007 cited in related U.S. Appl. No. 10/293,228.
Issue Notification mailed Oct. 3, 2007 cited in related U.S. Appl. No. 10/293,228.

* cited by examiner

*Primary Examiner*—Philip C Lee
*Assistant Examiner*—Bradford F Fritz
(74) *Attorney, Agent, or Firm*—Workman Nydegger

(57) ABSTRACT

A condition on a client that is communicating with a server is determined by issuing a challenge to the client, causing the client to produce a response indicative of the condition. The server compares the response to an expected response to determine if the condition is as expected, and if not, takes appropriate action, such as terminating the connection with the client. The challenge preferably includes parameters and a code segment that causes the client to produce the response by executing the code segment. The code segment could perform a one-way hashing algorithm of a portion of memory indicated in the parameters. The server can thus determine if the client is using a modified basic input output system, modified software, pirated software, or whether other conditions exist on the client. The challenge can be changed to prevent the client from returning a false, predetermined response to the challenge.

20 Claims, 8 Drawing Sheets

HANDLING FAILED CLIENT RESPONSES TO SERVER-SIDE CHALLENGES

CROSS-REFERENCE TO RELATED APPLICATIONS

This patent application is a continuation of, and claims priority to and the benefit of, commonly-assigned, non-provisional U.S. patent application Ser. No. 10/293,228, entitled "CHALLENGE AND RESPONSE INTERACTION BETWEEN CLIENT AND SERVER COMPUTING DEVICES," and filed on Nov. 9, 2002, which issued as U.S. Pat. No. 7,287,052 on Oct. 23, 2007, which is expressly hereby incorporated by reference in its entirety.

BACKGROUND OF THE INVENTION

1. Field of the Invention

This invention generally pertains to a server computing device verifying a condition existing on a client computing device, and more specifically, pertains to a server computing device issuing a challenge to a client computing device and comparing a response received from the client computing device to an expected response.

2. Background and Related Art

The playing of electronic games over the Internet by multiple players has become an increasingly popular pastime. Although games designed to run on personal computers (PCs) and on dedicated electronic game systems, such as Microsoft Corporation's XBOX™ game system, are designed to enable multiple players to play in a local game session, games played over the Internet offer users the opportunity to match skills against a much broader range of players and to play at any time. Multiplayer games over a network are typically implemented by enabling each of a plurality of client computing devices to connect to a server computing device over the network, so that the server computing device facilitates game interaction between the players of a plurality of different games. To simplify the following discussion, the term "client" will be used instead of client computing device, and the term "server" will be used instead of server computing device, but the broader concept of these entities is intended to apply.

Ideally, only the skill of players participating in online game play should determine who wins a game. However, online gamers are notorious for developing creative ways to cheat during online game play, so that a player's skill in playing a game is not necessarily determinative of who wins the game. For example, game software can be modified (for example, using a Game Shark program) to provide a player with more lives, more energy, more protection, and other attributes, so that the player has a substantial advantage over players who are running an unmodified version of the game program. Playing against another person who is cheating in this manner can be very frustrating and will not be enjoyable, since the game is often no longer won by the more skillful player, but instead, is won by the player who is cheating by using a modified game program. Accordingly, it would be desirable for a server at a game playing site to be able to detect if a player is using a modified game program so that the server can take appropriate action to prevent such a modified program from being used in online game play by a player who is connected to the server.

Dedicated electronic game playing systems can also be modified to enable a player to cheat when playing online games. For example, it is possible for a player to connect a replacement memory module containing a modified basic input output system (BIOS) to a game console, to replace the original BIOS, and thus, enable functionality and changes to the system that would not be permitted while running the system with the original BIOS. The modified BIOS can permit unauthorized or pirated copies of games to be played and can permit a user to avoid zone restrictions regarding games that can be played on the game console. More importantly, use of a modified chip in a game console can allow other types of cheating behavior during game play. Thus, it would also be desirable to detect modifications that have been made to an electronic game system when the game system is logging onto a game site to play a multiplayer game, and/or during play of such a game, to enable an appropriate action to be taken by a server at the site.

In a more general sense, it would further be desirable to enable a server to challenge a client device in regard to any desired condition on the client when the user of the client device is attempting to log on or sign in to a service provided on the server, to enable the server to determine if some characteristic or condition of the client is different than expected. It will be apparent that this procedure is not limited to a game playing function provided by the server or limited to game playing clients. If the response returned from a client is not as expected, then the server should be able to automatically take appropriate action. For example, the server might simply terminate the current session with the client, and might record an identification of the client in a database to prevent the client from ever again using the service provided on the server, even if the response returned from the client to the server in a future session is as expected.

SUMMARY OF THE INVENTION

A key aspect of the present invention is that a user of a client wants to connect to a server that provides a service desired by the user. In an initial application of the invention, the server is employed at a gaming site to provide the service of enabling players to participate in playing multiplayer games over the Internet, but it should be understood that the present invention is not limited to this application. Using a client, the user attempts to log on to the service provided by the server. In accord with the method of the present invention, during the log on process, and/or later during game play, the server sends a "challenge" to the client in the form of one or more code segments that include one or more parameters. The challenge will typically also include machine instructions that cause the client to follow a specific procedure to determine a response indicative of a condition on the client. For example, in the gaming application of this invention, the server may be determining whether the client is running with a modified BIOS or is using modified game software, or a pirated copy of a game. The response that is determined by the client is thus related to the condition to be detected on the client. This response is then sent back to the server and is compared to an expected response.

If the response matches the expected response, the desired service is provided to the client by the server. However, if the response does not match the expected response, or no response is returned at all, an appropriate predefined action may be automatically carried out by the server. For example, the server may simply record the response for future reference, or it may automatically terminate the current session, and/or it may permanently prevent the client or user from ever again participating in the service provided by the server, e.g., from ever playing online games using the gaming service provided by the server.

The machine instructions implemented by the client for determining the response can cause the client to apply a one-way hashing algorithm to a designated portion of the memory on the client, such as a portion of memory loaded with the BIOS, or a portion of memory that stores code for an application such as a game. Alternatively, the machine instructions can cause the client to apply the one-way hashing algorithm to a portion of a non-volatile memory accessible by the client. Since a pirated copy of a game program will typically only include portions of the original non-volatile medium on which the program was stored, the machine instructions can cause the client to apply the one-way hash to portions of the non-volatile medium on which random data was stored (but not the game program), to determine whether an authorized copy of the game software is being accessed by the client.

The designated portions of memory (or of the non-volatile medium) can be changed when the client subsequently again attempts to log on to the server. By changing either the parameters used in determining the response and/or the designated portions of memory (or of the non-volatile medium), and/or the details of the one-way hashing algorithm used to produce the response, it will be very difficult for a user of the client to provide a false response that matches an expected response.

To detect a pirated bit-for-bit copy of a non-volatile memory medium on which a game is distributed, the machine instructions provided to the client can cause it to attempt to read a portion of the non-volatile memory medium that has been made unreadable on all authorized copies. If the response does not indicate that the attempt to read the portion was unsuccessful, then the response will not match the expected response, and it will be apparent that the client is accessing a pirated copy of the game software.

Other aspects of the present invention are directed to a server or cluster of servers employed to provide a service to a plurality of clients connected to the server over a network, so that the server can detect a condition on a client. The server includes a memory in which a plurality of machine instructions are stored, a network interface for coupling to the plurality of clients, and a processor, coupled to the memory and to the network interface. The processor executes the machine instructions and carries out a plurality of functions that are generally consistent with the steps of the method described above. Another aspect of the present invention is directed to a memory medium on which machine instructions for carrying out the steps done by the server are stored.

The term "server" as used throughout this disclosure and the claims that follow is intended to refer to a single server computing device or to a plurality of computing devices. Thus, the term "server" will also be understood to refer to a cluster of computing devices working in tandem to provide the service that the client desires. The specific server computing device sending the challenge and evaluating the response received from the client might not necessarily be the same computing device that actually delivers the service. However, the failure to pass the challenge response process can cause the client to be denied further access to any of the server computing devices in the cluster (not just the one sending the challenge and/or evaluating the response). Furthermore, it will be understood that as used herein, the term "server" can also more generally refer to network computing devices such as routers or switches. A router or switch would issue the challenge and only forward packets from that client to other servers behind the router/switch if the correct (i.e., expected) response was returned by the client.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF EXEMPLARY EMBODIMENTS

A preferred embodiment of the present invention is described below in regard to controlling access to a server by a client. As noted above, the client can be, for example, a generally conventional personal computer (PC), a cell phone, a personal data assistant (PDA), or almost any other form of computing device that can connect over a wired or wireless network to a server. Thus, the term client will be understood to encompass existing computing devices or systems that are employed to connect to a server over a network, as well as computing devices that may be developed in the future to access a server via a network connection. In an initial preferred form of the invention, the client is a game console, and the server is employed in an online game system that facilitates multiplayer game play over the Internet. However, those skilled in the art will recognize that the present invention may also be implemented in many other environments in which a client is attempting to gain access to a server. The client and server can be connected via the Internet, or over another type of network, such as a local area network (LAN), an intranet, or a wide area network (WAN).

A server is currently understood to comprise one or more computing devices dedicated to performing server functions. But it will be understood that the term "server" is intended to encompass almost any computing device or system that performs server functions, including computing devices that may be developed in the future to perform server functions.

The "server" might even be one client handling a request to connect in a peer-to-peer session received from another client. The client that sends a challenge might generate the code segment sent to the other client itself or it might be provided with an appropriate challenge and expected response from another server, or the peer-to-peer client acting as a server might execute the challenge itself to determine the response expected from the other client.

Exemplary Computing Device

Figure 1:
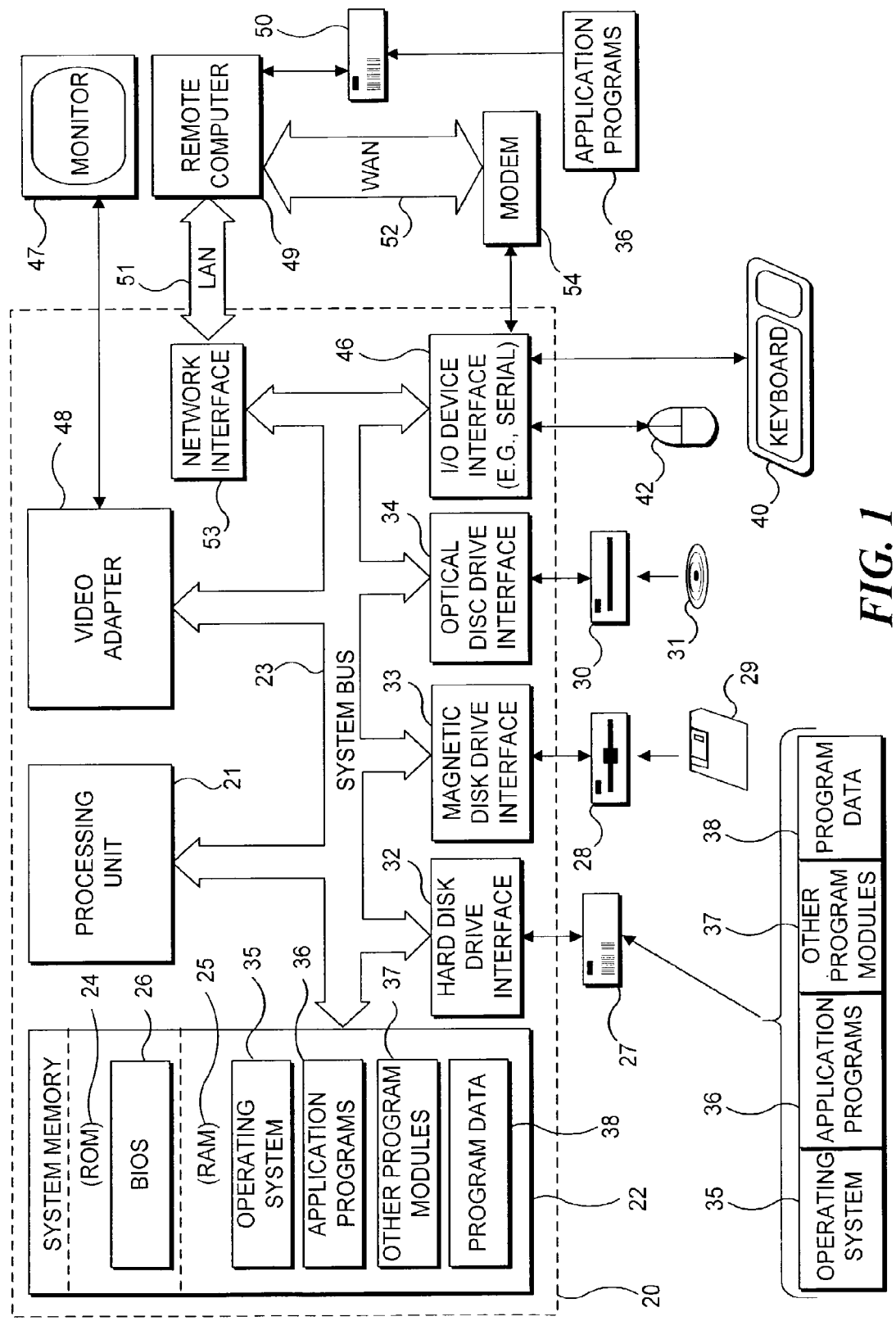
FIG. 1 is a functional block diagram of a general purpose computing device in the form of a conventional personal computer (PC) for use in an exemplary system in which the present invention is implemented.

FIG. 1 and the following discussion are intended to provide a brief, general description of a suitable computing environment in which software implementing the method of present invention may be implemented. The present invention may be practiced on a single server, but can also be practiced on a plurality of computing devices functioning as a server. Both the client and the server may each include the functional components shown in FIG. 1. While the present invention can clearly be implemented on a client comprising a general purpose PC, in an initial application of the present invention, the client comprises a gaming console, as described below. Nevertheless, the following discussion of a general purpose PC is provided in regard to the use of the PC as either a server or as a client.

Although not required, the present invention will be described in the general context of computer executable instructions, such as program modules, which are executed by a PC and/or a gaming console. Generally, program modules include application programs, such as computer simulations, routines, objects, components, functions, data structures, etc. that perform particular tasks or implement particular abstract data types. In addition, those skilled in the art will appreciate that this invention may be practiced with other computer system configurations, particularly in distributed computing environments, where tasks are performed by remote processing devices that are linked through a communications network. In a distributed computing environment, program modules may be located in either or both local and remote memory storage devices.

With reference to FIG. 1, an exemplary system for use as a server computer includes a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disc 29, and an optical disk drive 30 for reading from or writing to a removable optical disc 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disc 29, and removable optical disc 31, it will be appreciated by those skilled in the art that other types of computer readable media, which can store data that are accessible by a computer, such as magnetic cassettes, flash memory cards, digital versatile discs (DVDs), Bernoulli cartridges, RAMs, ROMs, and the like, may also be used in the exemplary operating environment.

A number of program modules may be stored on the hard disk, magnetic disc 29, optical disc 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information. In addition to the monitor, PCs are often coupled to other peripheral output devices (not shown), such as speakers (through a sound card or other audio interface (not shown)) and printers.

As indicated above, the invention is implemented in a networked environment, in which PC 20 is logically connected to one or more clients, such as a remote computer 49. Remote computer 49 may be another PC, a router, a network PC, a peer device, a satellite, or other common network node comprising a client. Remote computer 49 is a game console in one preferred application of the present invention, as will be described in greater detail below. Remote computer 49 may include many or all of the elements described above in connection with PC 20, may include the elements described below in connection with a gaming console, or may include typical elements of other electronic devices that can function as a client. So as not to make FIG. 1 unnecessarily complex, remote computer 49 is shown with only an external memory storage device 50. The logical connections depicted in FIG. 1 include a local area network (LAN) 51 and a wide area network (WAN) 52, which may encompass the Internet. Such networking environments are common in offices, enterprise wide computer networks, intranets, and in regard to computing devices coupled to the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication between remote computing devices is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Minimally Required Networked Environment

Figure 2A:
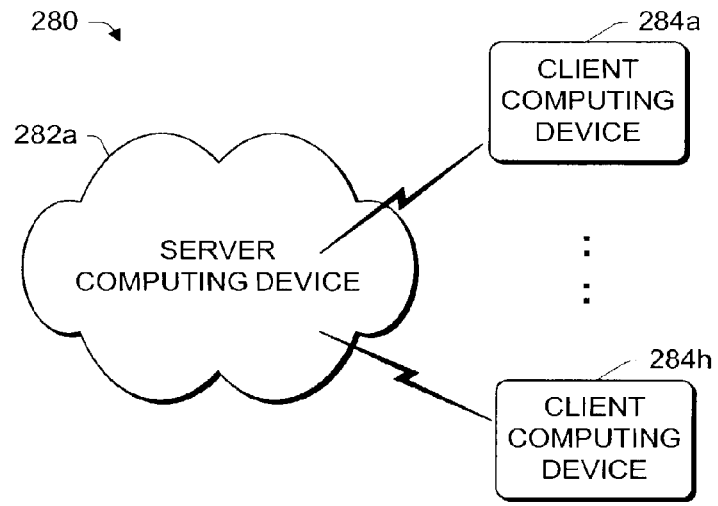
FIG. 2A is a schematic diagram of a basic network environment in which multiple clients are connected to a server.

As noted above, a key aspect of the present invention is that a user of a client wants to connect over a network, such as the Internet, to a server that provides a service or data desired by the user. Thus, to implement the present invention, a network environment including a client and a server is required. FIG. 2A schematically illustrates a basic network 280, including a server 282a, and multiple clients 284a, . . . 284h. While a network environment can exist between a server and a single client, most network environments include a plurality of clients, and often a plurality of servers as well. It should be understood that network 280 represents any of a wide variety of data communications networks and may include public portions (e.g., the Internet), as well as private portions (e.g., a private LAN and/or WAN). It should also be understood that network 280 may be implemented using any one or more of a wide variety of conventional communications configurations including both wired and wireless types. Any of a wide variety of communications protocols can be used to communicate data via network 280, including both public and proprietary protocols. Examples of such protocols include TCP/IP, IPX/SPX, NetBEUI, etc.

Figure 2B:
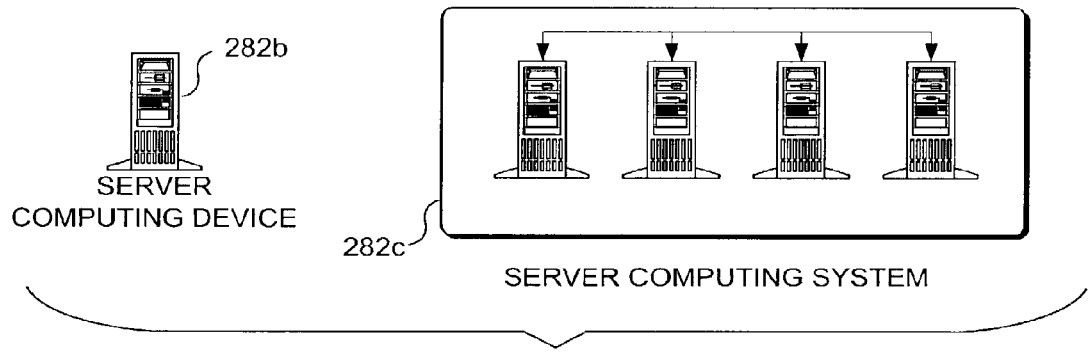
FIG. 2B schematically illustrates how a plurality of servers typically comprise a server computing system.

FIG. 2B schematically illustrates an exemplary server 282b. As noted above, servers generally comprise many of the components of PC 20, which has been described in detail above. It should be understood that servers employed in accord with the present invention might be implemented as a server computing system 282c, which includes a plurality of individual servers that share the task of providing a service to connected clients. As those of ordinary skill in the art will recognize, individual servers in a server computing system might share tasks equally (such as in a load balanced system), or the server computing system may assign specific tasks to specific servers.

Figure 2C:
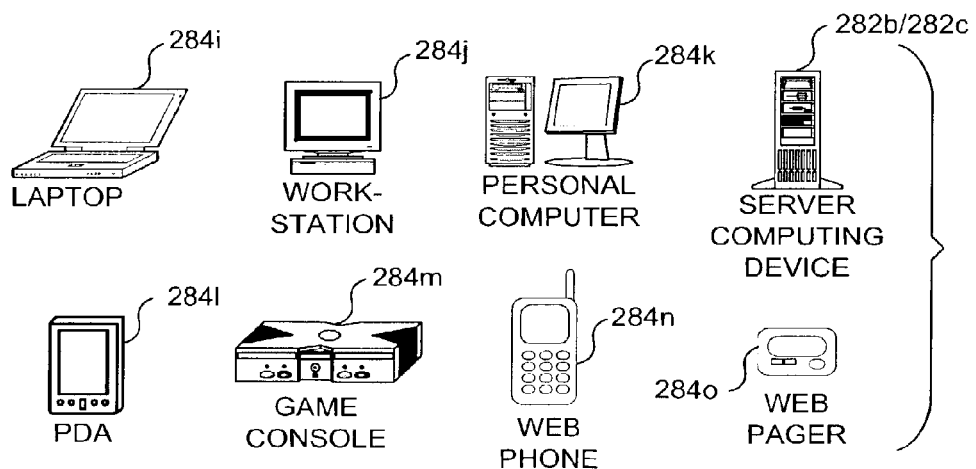
FIG. 2C schematically illustrates various types of clients with which the present invention can be used.

While a preferred embodiment of the present invention is utilized in conjunction with a client that is a network connected game console and a server that is an online game server, it is emphasized again that the present invention can be beneficially employed with other types of clients as well. FIG. 2C schematically illustrates a plurality of different types of clients that can be used to access a server, including without limitation, a laptop computer 284i, a workstation 284j, a PC 284k, a PDA 284l, a game console 284m, a Web enabled wireless phone 284n, and a Web enabled pager 284o. FIG. 2C also indicates that server 282b or server computing system 282c can also be considered to be a client, when the server is employed by a user who desires to access a service provided by a different server.

While it should be clearly understood that the present invention can be implemented to control access to a server from a number of different types of clients, a preferred embodiment of the present invention is implemented in controlling the access of network connected game consoles to a server that facilitates game play. But, the present invention is not limited to clients that are game consoles, and to a server that facilitates game play. Other types of cients, and servers performing different functions, are encompassed in the present invention.

Exemplary Client

Figure 3:
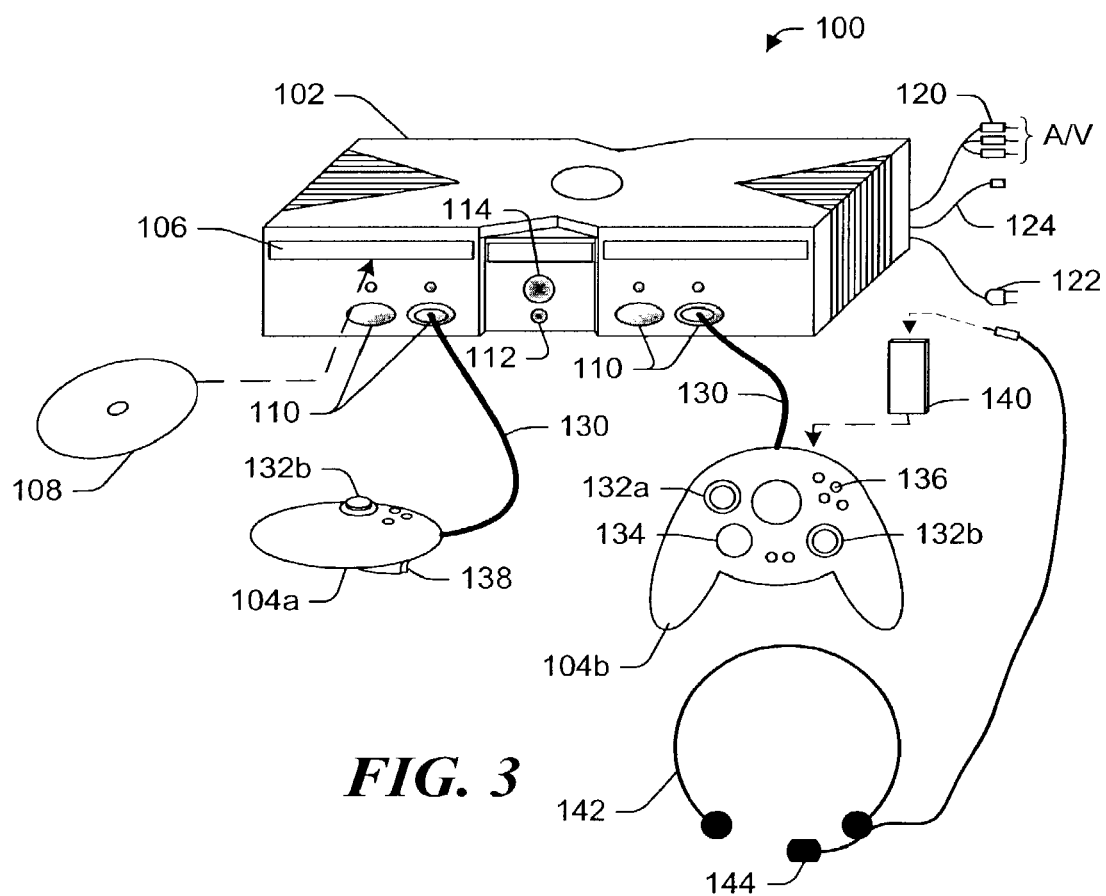
FIG. 3 is an isometric view of an exemplary client electronic gaming system that includes a game console and support for up to four user input devices.

FIG. 3 illustrates an exemplary electronic gaming system 100, which includes a game console 102 and support for up to four user input devices, such as controllers 104a and 104b. Of course game consoles supporting only a single user input device, or additional user input devices, can also be employed. Game console 102 is equipped with an internal hard disk drive (not shown in this Figure) and includes a portable media drive 106 that supports various forms of portable optical storage media, as represented by an optical storage disc 108. Examples of suitable portable storage media include DVD discs and compact disk-read only memory (CD-ROM) discs. In this gaming system, game programs are preferably distributed for use with the game console on DVD discs, but it is also contemplated that other storage media might instead be used on this or other types of clients in connection with the present invention.

On a front face of game console 102 are four ports 110 for connection to supported controllers, although the number and arrangement of ports may be modified. A power button 112, and an eject button 114 are also disposed on the front face of game console 102. Power button 112 controls application of electrical power to the game console, and eject button 114 alternately opens and closes a tray (not shown) of portable media drive 106 to enable insertion and extraction of storage disc 108, so that the digital data on the disc can be read for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 includes an Ethernet data connector 124 to transfer and receive data over a network (e.g., through a peer-to-peer link to another game console or through a connection to a hub or a switch (not shown)), or over the Internet, for example, through a connection to an xDSL interface, a cable modem, or other broadband interface (not shown). Other types of game consoles may be coupled together in communication using a conventional telephone modem.

Each controller 104a and 104b is coupled to game console 102 via a lead (or alternatively, through a wireless interface). In the illustrated implementation, the controllers are universal serial port (USB) compatible and are connected to game console 102 via USB cables 130. Game console 102 may be equipped with any of a wide variety of user devices for interacting with and controlling the game software. As illustrated in FIG. 2, each controller 104a and 104b is equipped with two thumbsticks 132a and 132b, a D-pad 134, buttons 136, and two triggers 138. These controllers are merely representative, and other gaming input and control devices may be substituted for or added to those shown in FIG. 3 for use with game console 102.

A removable function unit 140 can optionally be inserted into controller 104 to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. In the described implementation, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from the MU. For example, gaming system 100 is capable of playing:

Game titles stored on CD and DVD discs, on the hard disk drive, or downloaded from an online source;

Digital music stored on a CD in portable media drive 106, in a file on the hard disk drive (e.g., WINDOWS MEDIA AUDIO™ (WMA) format), or derived from online streaming sources on the Internet or other network; and Digital AV data such as movies that are stored on a DVD disc in portable media drive 106, or in a file on the hard disk drive (e.g., in an Active Streaming Format), or from online streaming sources on the Internet or other network.

Figure 4:
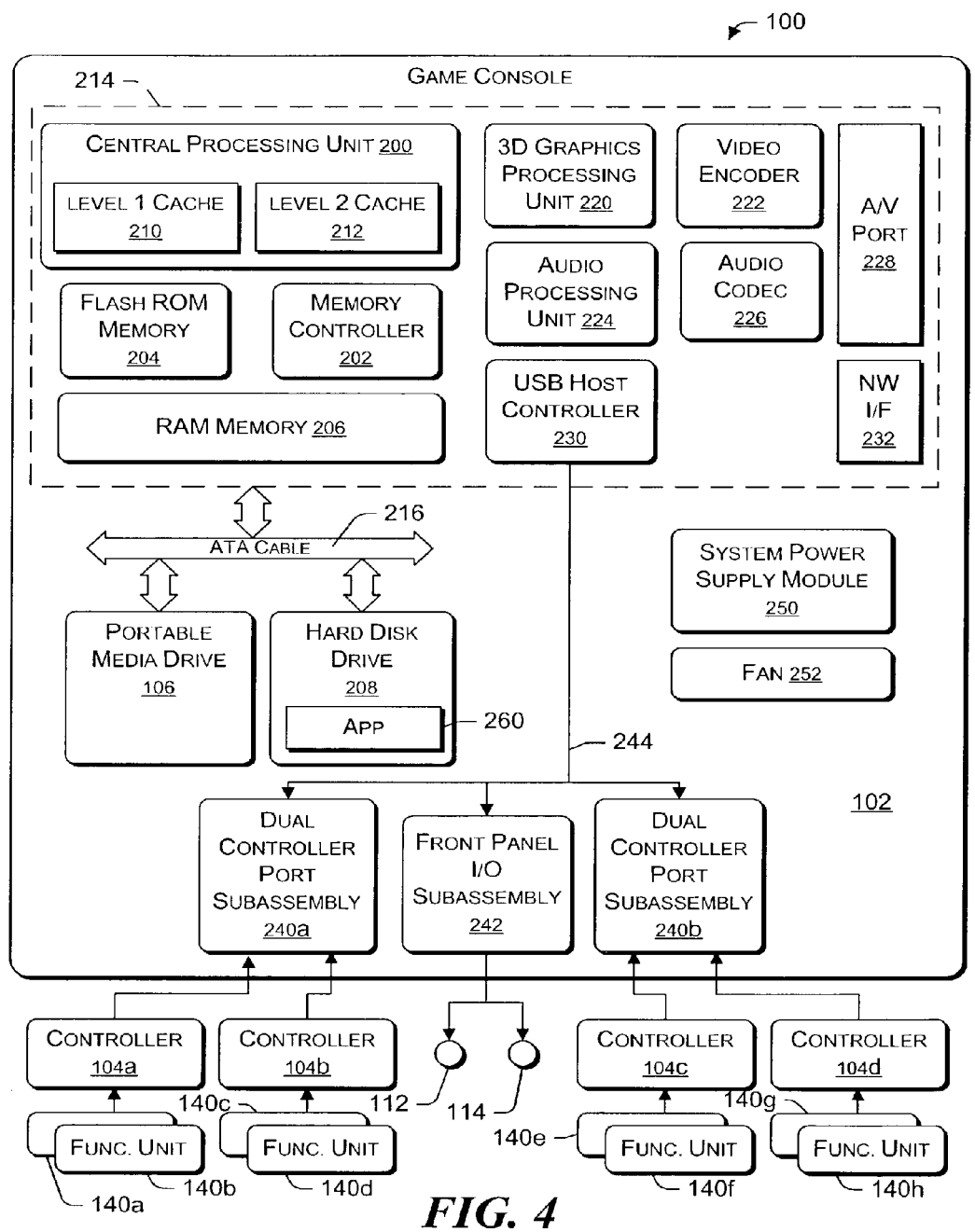
FIG. 4 is a functional block diagram showing functional components of the client gaming system of FIG. 3.

FIG. 4 shows functional components of gaming system 100 in greater detail. Game console 102 includes a central processing unit (CPU) 200, and a memory controller 202 that facilitate processor access to a read-only memory (ROM) 204, a random access memory (RAM) 206, a hard disk drive 208, and portable media drive 106. CPU 200 is equipped with a level 1 cache 210 and a level 2 cache 212 to temporarily store data so as to reduce the number of memory access cycles required, thereby improving processing speed and throughput. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As an example of one suitable implementation of the game console, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAMs (DDR SDRAMs) that are independently controlled by memory controller 202 via separate buses (not shown). Hard disk drive 208 and portable media drive 106 are connected to the memory controller via the PCI bus and an Advanced Technology Attachment (ATA) bus 216.

A three-dimensional (3D) graphics processing unit (GPU) 220 and a video encoder 222 form a video processing pipeline for high-speed and high-resolution graphics processing. Data are carried from graphics processing unit 220 to video encoder 222 via a digital video bus (not shown). An audio processing unit 224 and an audio encoder/decoder (CODEC) 226 form a corresponding audio processing pipeline for high fidelity and stereo audio data processing. Audio data are carried between audio processing unit 224 and audio CODEC 226 via a communication link (not shown). The video and audio processing pipelines output data to an A/V port 228 for transmission to the television or other display monitor. In the illustrated implementation, video and audio processing components 220-228 are mounted on module 214.

Also implemented by module 214 are a USB host controller 230 and a network interface 232. USB host controller 230 is coupled to CPU 200 and memory controller 202 via a bus (e.g., the PCI bus), and serves as a host for peripheral controllers 104a-104d. Network interface 232 provides access to a network (e.g., the Internet, home network, etc.) and may be any of a wide variety of various wire or wireless interface components, including an Ethernet card, a telephone modem interface, a Bluetooth module, a cable modem interface, an xDSL interface, and the like.

Game console 102 has two dual controller support subassemblies 240a and 240b, with each subassembly supporting two game controllers 104a-104d. A front panel I/O subassembly 242 supports the functionality of power button 112 and eject button 114, as well as any light-emitting diodes (LEDs) or other indicators exposed on the outer surface of the game console. Subassemblies 240a, 240b, and 242 are coupled to module 214 via one or more cable assemblies 244.

Eight function units 140a-140h are illustrated as being connectable to four controllers 104a-104d, i.e., two function units for each controller. Each function unit 140 offers additional functionality or storage on which games, game parameters, and other data may be stored. When an MU is inserted into a controller, the MU can be accessed by memory controller 202. A system power supply module 250 provides power to the components of gaming system 100. A fan 252 cools the components and circuitry within game console 102.

To implement the preferred embodiment of the present invention, a game software application 260 comprising machine instructions stored on a DVD or other storage media (or downloaded over the network) is loaded into RAM 206 and/or caches 210, 212 for execution by CPU 200. Portions of software application 260 may be loaded into RAM only when needed, or all of the software application (depending on its size) may be loaded into RAM 206. Software application 260 is described below in greater detail.

Gaming system 100 may be operated as a stand-alone system by simply connecting the system to a television or other display monitor. In this standalone mode, gaming system 100 enables one or more users to play games, watch movies, or listen to music. However, with connectivity to the Internet or other network, which is made available through network interface 232, gaming system 100 may be further coupled to another gaming system or operated as a component of a larger network gaming community, to enable online multiplayer interaction in games that are played over the Internet or other network with players using other gaming systems.

If a user desires to connect to a server to experience networked game play, an activity that is increasingly popular, gaming system 100 attempts to access a server (not shown in this FIGURE) through the network connection described above. As will be described in greater detail below, the server challenges each game system that attempts to gain access to the server. Based on a response to the challenge received by the server from the client game system, the server determines an appropriate predetermined action.

Exemplary Gaming Network System

Figure 5:
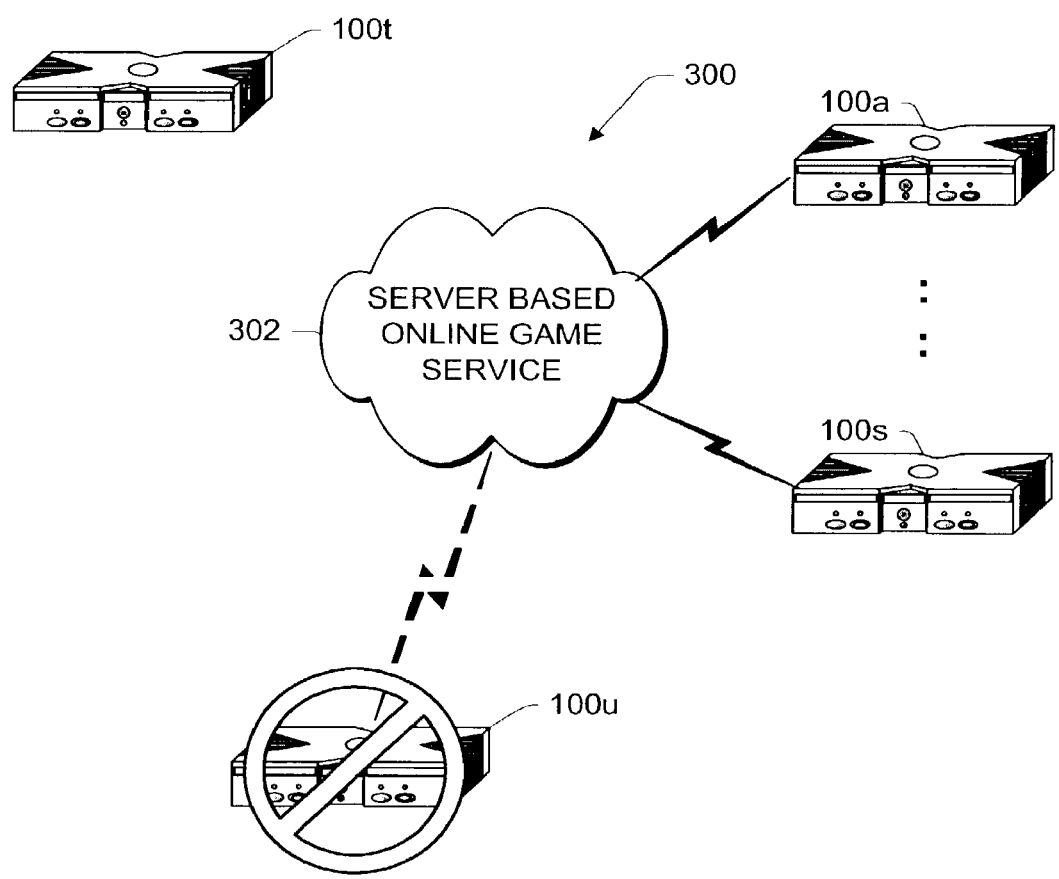
FIG. 5 is a schematic diagram of an exemplary gaming network environment in which multiple client game consoles are connected to a game server, while one client game console is precluded from connecting to the game server.

A preferred embodiment of the present invention will be implemented in conjunction with Microsoft Corporation's XBOX LIVE™ online gaming network. FIG. 5 shows an exemplary gaming network 300 that includes multiple gaming systems 100a . . . 100s, each of which is logically connected to a server based online game service 302, hereafter referred to simply as game server 302. It should be understood that each gaming system represents a client. As described above in conjunction with FIG. 2B, game server 302 can be a single server, or more likely, will comprise a plurality of servers grouped together into a server computing system. Network 300 is similar to network 280 and may be implemented using any one or more of a wide variety of conventional communications configurations, including both wired and wireless types. Any of a wide variety of communications protocols can be used to communicate data via network 300, including both public and proprietary protocols. Examples of such protocols include TCP/IP, IPX/SPX, NetBEUI, etc.

In general, game server 302 provides a gaming related service for the clients connected to it (i.e. for the users of each game system 100), such as coupling clients together in communication to facilitate game play between players, serving and/or hosting online games, serving downloadable game related files, hosting gaming competitions, serving streaming game related A/V files, enabling exchange of text based or voice messages between participants during game play, and the like. It should be emphasized, however, that the present invention is not limited to application with only these or other game related server functions, since many other types of services may be provided by the server.

Note that network 300 includes game system 100t, which is not yet connected to game server 302. In describing a preferred embodiment of the present invention, the establishment of a network connection between game system 100t and game server 302 will be described in greater detail below. FIG. 5 also shows the universally understood symbol for "no" superimposed on a game system 100u, with a broken line extending between game system 100u and game server 302, indicating that the network connection between game system 100u and game server 302 has been terminated. As will be described in greater detail below, especially when the present invention is implemented in a game network environment, one predetermined action by a server when a client fails a challenge is to both immediately terminate a current network connection between that client and the server, and/or to subsequently refuse any subsequent attempts by that particular client to establish a network connection with the server. Thus, in the example of FIG. 5, game system 100u failed to properly respond to a challenge issued by game server 302, and the logical network connection between game system 100u and game server 302 has been terminated by game server 302. Furthermore, in this example, game server 302 will record an identifying indicia (e.g., a serial number) for game system 100u and will refuse any future attempts by game system 100u to establish a logical network connection to game server 302 at a future time, by detecting that identifying indicia when game system 100u next again attempts to connect to the game server.

Overview of the Logical Process

Figure 6:
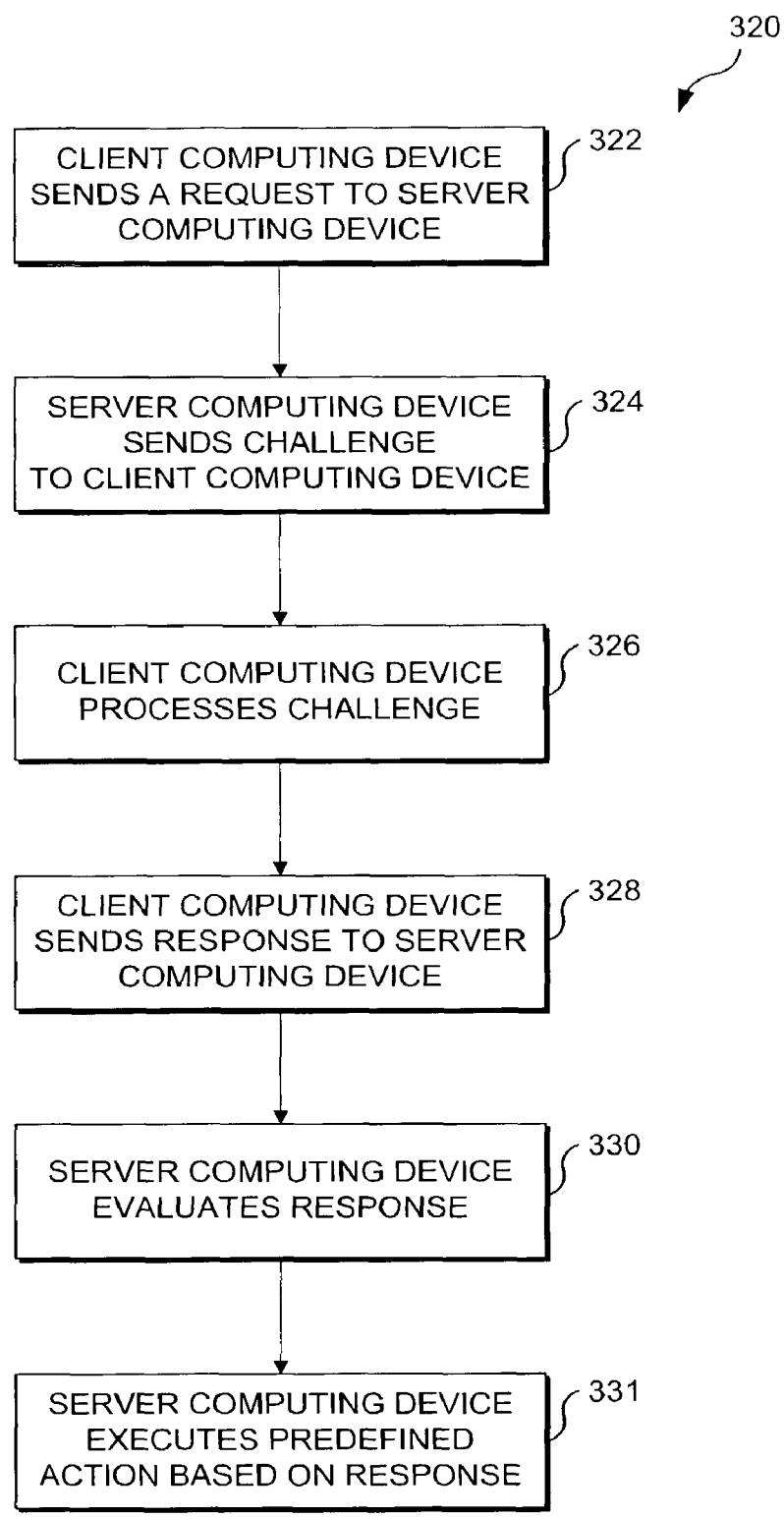
FIG. 6 is a flow diagram illustrating the overall logical steps implemented in the present invention.

In FIG. 6, a flow chart 320 illustrates the logical steps employed in the present invention to challenge a client before enabling the client to access a server. In a block 322, a client sends a request to a server. The present invention enables a server to evaluate a condition on a client before allowing the client to access a service or data provided by the server. In a conventional network, a server may require entry of a user name and a password, but will not attempt to determine a condition on a client before permitting the client access to a service provided by the server. However, the present invention enables a server to first determine a condition related to a hardware and/or software configuration on the client. Accordingly, the present invention is useful only in those situations in which the user of a client desires a service or information provided by the server, and attempts to establish a logical connection with or through the server. If the user does not want the service provided by the server and never attempts to connect to the server, the server will not have the opportunity to evaluate the condition on the client.

It is contemplated that most often block 322 will represent a client's attempt to log on to a server. It should be understood, however, that block 322 can represent any subsequent request by a client (after a successful log on) to access or continue to access a service or information controlled by the server. In any single session involving a logical network connection between a client and a server, it should be understood that block 322 could be implemented immediately upon the establishment of such a logical connection, or at any time subsequent to the establishment of such a logical connection. In some circumstances, as will be described in additional detail below, it may be beneficial to challenge a client both at an initial log on attempt, and also at one or more times during a communication session between a client and a server.

In a block 324, the server sends a challenge to the client. While details of the preferred forms of challenges that can be sent by servers to clients are discussed below in greater detail, it should be understood that the challenge is not simply a server requesting a client to provide knowledge of a password or some other credential to be able to obtain access to the system. The challenge is directed to determining a characteristic or condition of the client to determine if the condition on the client is as expected by the server. It is contemplated that a plurality of different challenges will be pregenerated and available to a server, each challenge being associated with a corresponding expected response. Different challenges can test for the same condition on the client. The server can then select one of the plurality of pregenerated challenges to send to the client. For each such pregenerated challenge, the server will have computed an expected response, based on known characteristics of a condition expected to be on the client. Conditions that might be evaluated by such challenges include, for example, the BIOS utilized by the client, hardware configuration of the client, and software being utilized by the client.

In a block 326, the client processes the challenge received from the server. As noted above, the challenge is not a request for knowledge of a password or some other credential to be entered and does not require any action by a user of the client. Preferably, the challenge is in the form of executable code segment that is sent from the server to the client. The client executes the code segment received from the server and then transmits the response generated by executing the code back to the server for evaluation. In at least one preferred embodiment, the challenge will include the code to implement a one-way hashing algorithm, such as SHA-1 or MD5, of a designated portion of memory on the client or of a designated portion of a DVD or other non-volatile storage accessible by the client. The challenge will preferably also include one or more parameters that affect the expected result.

In a block 328, the response computed by the client is sent to the server. In a block 330, the server evaluates the response computed by the client. At this point, based on the response received from the client, the server can execute any one of a number of pre-defined actions based on the response received from the client, as is indicated in a block 331. If a client fails to send the expected response to a challenge to the server, or if no response was received from the client, the server can respond in a variety of different ways. For example, the server can merely log the incident for tracking purposes. Under other circumstances, the server can refuse the request from the client and terminate the logical network connection between the client and the server. Another option would be for the server to terminate the logical connection with the client. In addition, the server can refuse any future attempts by the client device or user to establish a logical network connection with the server.

To accurately determine the client or user identity in order to refuse future server connections with the client or user, the challenge and response process described herein can be carried out after an authentication process (wherein credentials, such as a password, smartcard, etc.) has already been used to identify the client device and/or user. By performing the challenge response process after the authentication process, the identity of the client device and/or user can be accurately determined, and the permanent blocking of the client identity (whether it be a client device or a user) from the server can be accurately targeted at the authenticated identity.

Figure 7:
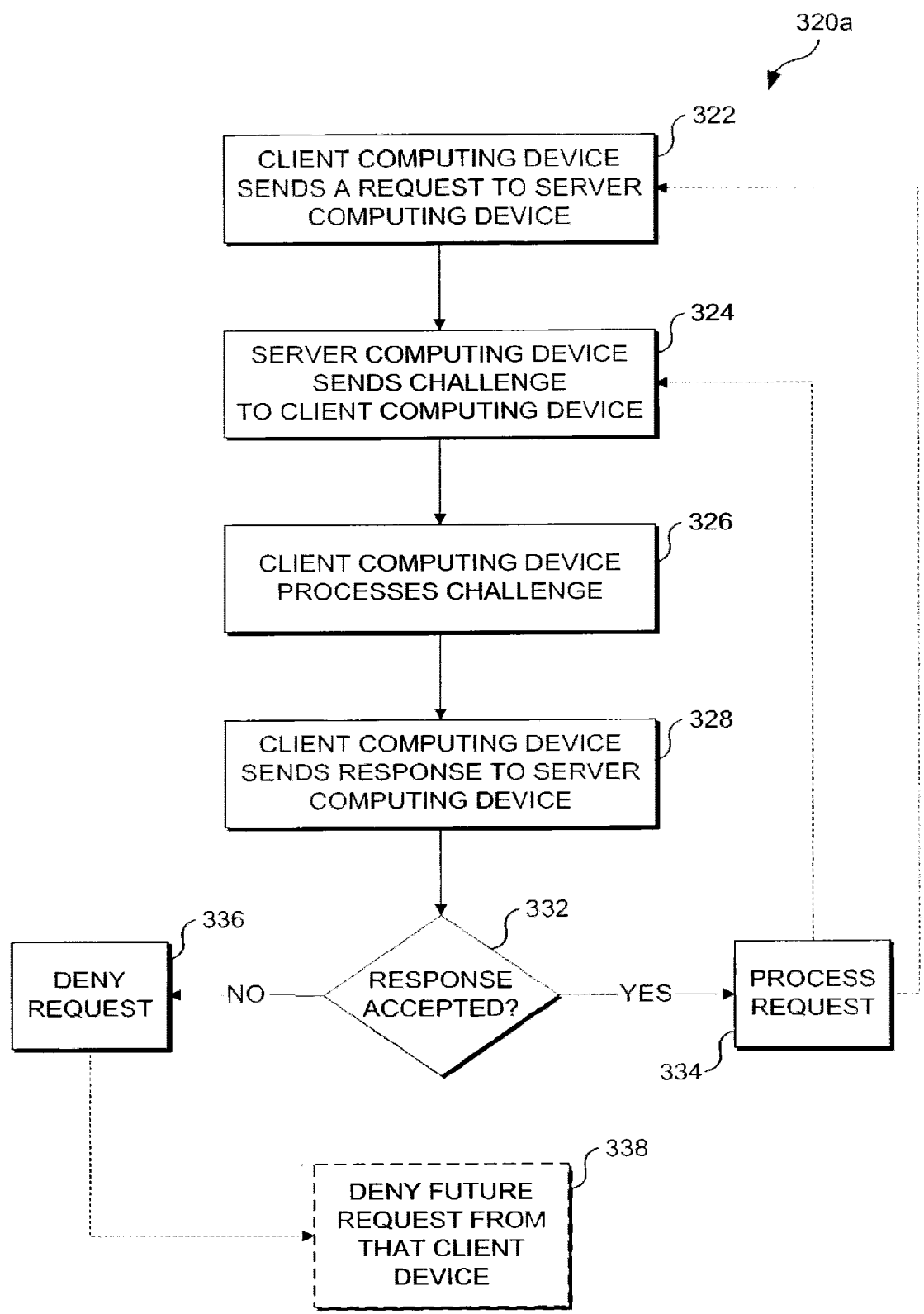
FIG. 7 is a flow diagram based on the flow diagram of FIG. 6, illustrating potential server responses to failed challenges, and the use of optional subsequent challenges.

FIG. 7 shows a modification of the steps of FIG. 6, in a flow chart 320a that omits steps 330 and 331, but adds steps 322, 324, 326, and 328. The client sends a request to a server, the server sends a challenge to the client, the client processes the challenge and the client sends the computed response to the server. In flow chart 320a, the response from the client is analyzed in a decision block 332 to determine whether the server will accept the response. If in decision block 332 the server determines that the client returned an incorrect response (that doesn't match the expected response), the server denies the request from the client in a block 336. Preferably, in this embodiment, at that point the logical network connection between the client and the server will be terminated. It is possible that a condition that exists at the client can be modified (e.g., corrected) such that a subsequent challenge from the server can be processed by the client and so that the client will then provide a response that matches the expected response. Or, it may be preferable to ban a client from any future connection with the server if the client's response does not match the expected response in a single instance. Thus, as indicated in an optional block 338, if the server has denied the request from the client in block 336, all future requests from that client device or user identity are ignored in a block 338.

Referring once again to decision block 332, if the response from the client is accepted by the server, then the request from the client is processed in a block 334. As a further alternative, the challenge process can be repeated at a subsequent time during the current session that the client sends a request to the server. While sending a challenge in response to every request from a client to a server will likely not be practical, it is possible to again send a challenge to a client making a subsequent request, as indicated by the dash lines connecting blocks 334 and 322.

Challenges can also be subsequently issued to the client by the server at random times to determine if the client has changed some condition after passing the initial challenge. For example, if the condition being checked is a determination of whether the client is using modified software, it might be possible for the client to pass an initial challenge, but to subsequently start using modified software. By issuing one or more subsequent challenges during the session, such a change in the software being used can be detected. Flow chart 320a thus illustrates this optional subsequent challenge, with the dashed line connecting blocks 334 and 324.

Preferred Process for Implementing Challenges in a Gaming Network

Figure 8:
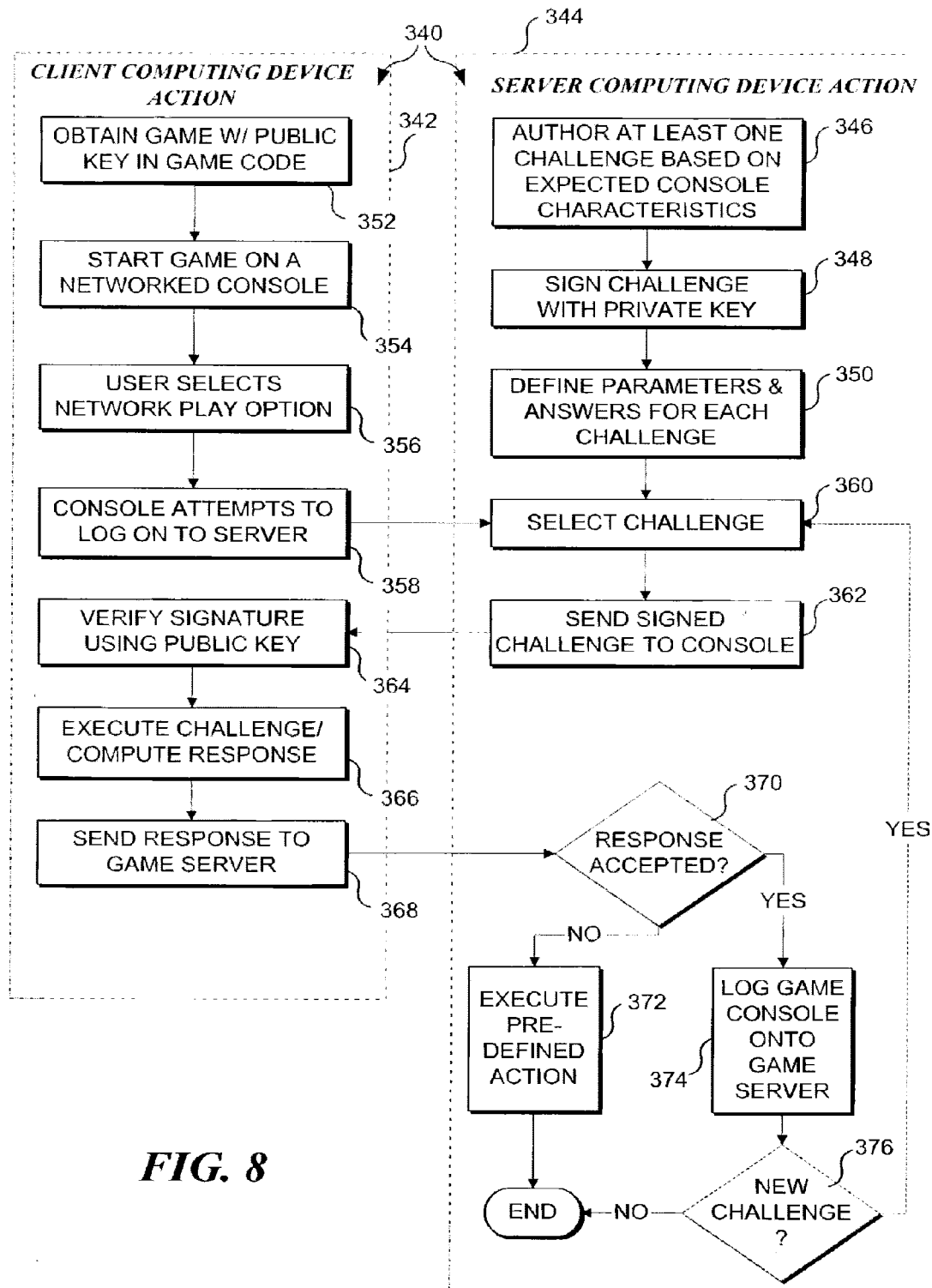
FIG. 8 is a flow diagram illustrating preferred logic used to implement the present invention in the game network environment of FIG. 5.

FIG. 8 illustrates a flow chart 340 that shows the logical sequence of steps executed by both the client and the server in the gaming network of FIG. 5. In the following discussion, it is assumed that game system 100t is attempting to access game server 302 (both shown in FIG. 5). However, it should be understood that the logical process described below could also be employed with other network enabled gaming systems, and that the present invention is not limited in application to only game system 100.

With regard to FIG. 8, the logical steps executed by the game console are grouped in a dash line box 342, while the logical steps executed by the game server are grouped together in a dash line box 344. Before a game console attempts to log on to the game server, several steps must be carried out. Referring to box 342, a user of a game console must obtain a compatible game, as indicated in a block 352. The game must support network play. Also, either the game console or the game will include a public key for use in enabling the game console to authenticate challenges received from the game server as originating from a trusted source. All XBOX™ game consoles include a public key corresponding to the private key that is used by the XBOX LIVE™ game servers for digitally signing challenges sent to the game console. In a block 354, a user selects a network enabled game and inserts the game disc (a single-sided, double layer DVD disc for network enabled XBOX™ games) into the game console. From the game start menu, a user selects a network play option in a block 356, which causes the game console to attempt to log on to the game server, as indicated in a block 358.

Referring now to the logical steps executed by the server, as indicated in dash line box 344, several logical processes also are preferably executed in the present invention before issuing a challenge to a log on request from a game console. In a block 346, at least one challenge is preferably authored, based on the expected console characteristics. Note that challenges could be authored on the fly, but doing so would likely undesirably reduce the real-time performance of the game server. Preferably, a plurality of challenges will be pre-authored, so that the game server can select different challenges to issue at different times.

Several different types of challenges are implemented in this preferred embodiment. The first type of challenge is referred to as a code challenge. A code challenge is a segment of executable code that is sent from the game server to the game console. The game console executes the code segment, which comprises a plurality of machine instructions, causing the game console to compute a response that will be returned to the game server for comparison to an expected response. Challenges are authored so that the game server determines what the correct or expected response should be. With respect to game systems 100 as described above, the characteristics of such game systems are very well defined. Any change to the configuration of game system 100, such as the addition of a modified chip (i.e., a "mod chip"), which is used to provide a modification to the original BIOS, can readily be detected with an appropriate challenge.

Particularly with respect to game consoles, a challenge can detect whether the ROM/kernel image of the game console has been modified. Such modifications are done to enable client code modification, and also can enable a user to employ modified game software to cheat during game play. Given sufficient time and resources, almost any challenge might be defeated if it is always used without any change. However, by utilizing a plurality of different challenges in which either parameters sent with the challenge, and/or the content of the code segment, and/or the portion of memory checked by the code segment is changed, it will be very difficult to employ a modified game console that is not detected. Even though a switch may be used to restore the original BIOS chip into the game console circuit, a single instance of forgetting to restore the original chip can result in the game console being thereafter forever banned from connecting to the game server for online play. By employing a plurality of different challenges, and authoring new challenges in response to work-arounds being issued to defeat old challenges, the game server can effectively stay one step ahead of game console users who wish to cheat by modifying their game consoles.

Many different code challenges can be pre-authored, and the administrator of the game server can control the gradual release of these pre-authored code challenges in such a manner that should likely avoid any organized attempt to work around the challenges. Preferably, the specific challenge used at any given time will be randomly selected from a pool of available challenges. Thus, previously used challenges are randomly reused, making it very difficult to anticipate the expected response that must be sent to the game server. For example, a new challenge can be released for each day of the year. On the day a new challenge is first used, a game console attempting to access the game server is more likely to encounter the new challenge, although previously issued challenges might also be issued by the game server that day, but with a lower frequency. Such a timed, but randomized release of new and old challenges will result in unpredictable new challenges being encountered so frequently that avoiding a challenge not previously encountered or an unrecognized challenge issued by the game server becomes extremely difficult.

In addition to authorizing a plurality of different code challenges, each code challenge can be issued with a plurality of different parameters that change how the game console computes the response. For example, a preferred code challenge will be to perform a one-way hash of the contents of memory that contain the game console's BIOS. As noted above, the SHA-1 hashing algorithm or the MD5 hashing algorithm are examples of one-way hashing algorithms that can be beneficially employed. Because the BIOS of the game console is known, and the game code for each game is known, the game server has the required knowledge of what the result of applying a one-way hashing algorithm to a designated portion of memory on the game console or of a designated portion of the data section of memory or of a designated portion of a DVD, when the game console attempts to log on to the game server. If this were the only form of the code challenge that was ever issued by the game server, a determined user might successfully determine the one-way hash algorithm employed, and determine what the expected response produced on an unmodified game console would be. To defeat that code challenge, a modified game console would be instructed to respond to each challenge with the predetermined response.

However, by modifying the parameters sent with the code challenge from time to time, the game server can significantly increase the difficulty in determining what the expected response should be. For example, the expected response will change if the game console is instructed to perform the hashing algorithm on a different portion of memory. Simply by changing the starting and ending range of the game console's memory that is to be hashed, as indicated in the challenge issued by the game server, the expected response will be dramatically changed. Changing even a single bit in the portion of the memory of the game console that is hashed will cause a substantial change in the result of the one-way hashing algorithm.

Another parameter that can be used to increase the difficulty of overcoming a code challenge based on a one-way hash of the game console's memory is to include different seed/initialization vectors to initially feed the one-way hash. The different challenges can thus include different initializing vectors that are included with a portion of the memory that is hashed, to change the expected result. Also, the hashing code can be modified in different challenges. For example, the code might require that an XOR operation be performed on a portion of the memory before being hashed.

Note that the memory range parameter, seed/initialization parameter, and changes to the code implemented, as discussed above, are merely exemplary of the various parameters that can be employed in the challenges sent by the game server, and are not intended to be limiting on the invention. Clearly, by including parameters into a code challenge, the game server can achieve the goal of increasing the number of different code challenges sent to a game console.

Other portions of the game consoles memory can also be used in code challenges that require a game console to compute a one-way hash. The hash can be based on the game console's RAM memory, ROM memory, hard drive, or DVD disc memory, or on combinations of all of, or selected portions of each such memory. A game console that contains non-modified content in memory will return a computed response that matches the response expected by the game server, because the game server knows what should be in a game console's RAM memory, ROM memory, hard drive, or DVD disc memory. In the context of game consoles, and game software, such knowledge is readily determinable. An incorrect response from a game console reveals that a modification has been made to one or more of the game console's RAM memory, ROM memory, hard drive, or DVD disc memory (depending on which memory was hashed in accord with the challenge). Employing a one-way hash makes it impossible to change any single bit of the expected content without being detected.

The portions of the game consoles that can be examined by such code challenges are virtually unlimited. Preferably code challenges will be authored to specifically check code segments of the game that might be modified. Segments of the game code can also be checked to make sure that Game Shark type devices are not being used to modify values such as "the number of lives you have left," or "the available size of an energy bar." The hard drive of the game console can also be checked to detect whether a change has been made to selected files, such as changes to a video driver that allows the player on the game console to see through walls. A code challenge directed to the hardware of the game console can determine if the hardware of the game console has been modified, such as by adding an additional, or a larger hard drive.

Another form of challenge is referred to as a DVD challenge. A DVD challenge verifies that random regions of the original authorized copy of the software medium on which the game was distributed are present, and do not differ from what the game server expects. The goal of this challenge is not so much to detect game console users who have modified their game console to cheat, but rather to detect the presence of pirated software. Pirated software is copied from an authorized DVD onto compact discs, and they store only the essential portions of the game program that were on the original authorized DVD. It is much cheaper to copy data on a DVD onto a CD-ROM, and equipment to copy data onto CD-ROMs is much more widely available. While dual layer DVDs hold significantly more data as compared to CDs (9 gigabytes versus about 700 megabytes), many games are not sufficiently large to completely fill a DVD. The balance of such a DVD is filled with random bytes. Pirate copies of game DVDs made on CD-ROMs do not include these extra random bytes.

A DVD challenge requires the game console to compute a one-way hash of a segment on the DVD (that segment including at least a portion of the random bytes included on the DVD). If a game console is using an unauthorized copy made on a CD-ROM rather than the original DVD, the response computed by the game console will be incorrect, and the challenge will detect the presence of the pirated copy, rather than the original authorized copy of the game on DVD.

One possible work-around to this challenge would be to store an exact copy of the DVD on a hard disk in the game console. However, an appropriate code challenge can be used to detect hardware modifications, such as the addition of a large size hard drive and a modified BIOS that would permit an online game to be played online. Accordingly, it is preferable to combine a code challenge to detect a modified game console with a DVD challenge to detect pirated software.

It should be noted that this mechanism is not useful to detect pirated DVD discs that copy the entire original DVD image bit-by-bit. However, the manufacturing equipment required at this point to generate a dual layer, single-sided 9 gigabyte DVD is so expensive as to preclude most individuals from making such copies. Should the cost of such equipment drop to a point that duplicating DVDs is easily achieved, another possible DVD challenge could be based on deliberately including defects in game DVDs during the manufacture of authorized game disks. Such original disks could be manufactured with deliberate defects in certain non-critical areas of the disk. Those defects will return a memory read error when an attempt is made to read that portion of the disk. A challenge could deliberately check for the presence of read errors that would be expected when reading the original authorized media, and if no read errors occur at the areas that are known to contain defects, the expected result would not be obtained and the game server would take appropriate action.

When a challenge is performed, the specific byte region to be used to perform the one-way hash should be part of the parameters received from the game server in the challenge. The code (i.e., the one-way hashing algorithm) to actually compute the response can be stored in ROM on the game console (or could be stored on the game media, i.e., on the game DVD) instead of being included in the challenge sent from the game server. While this approach would reduce the size of each challenge issued by the game server, it presents a problem, since the code to implement the one-way hash algorithm can now be relatively easily discovered by a hacker. Nevertheless, by changing other parameters sent in the challenge, it would still be difficult for a game console to send back a false expected result instead of an actual computed result that does not match the expected result.

DVD challenges can be used in conjunction with code challenges within the same challenge response sequence to detect both modifications to the game console and pirating in a single challenge and response sequence. The DVD challenge and code challenge can be used together to detect if any modifications have been made to the code controlling the game console that might avoid the DVD challenge by hashing data from another media other than the DVD, such as a bit-for-bit copy of the game program stored on a hard drive. While the data from the hard drive could be used to successfully defeat the DVD challenge, the code challenge will detect the modification to the BIOS that enables a game to be played from software stored on the hard drive instead of from the DVD, thereby preventing the modified game console from passing the combined challenge.

The DVD challenge described above is specifically designed to detect unauthorized copies of software and is clearly applicable to non gaming environments where software piracy detection is desired. However, the detection of unauthorized software in this manner will not occur unless the user of the software desires access to a server that implements the present invention. Although the code challenges and DVD challenges described above employ one-way hashing algorithms, challenges can be based on other procedures carried out by executing code sent from the server to the client and are not limited to hash algorithms. The use of one-way hash algorithms is merely exemplary, and not limiting of the present invention.

Referring once again to flow chart 340, in a block 348 each pre-authored challenge is signed with a private key. The use of the private key, although not required, is preferred. In the present invention, a code segment is sent from the server to the client. Generally, when any computing device receives executable code from an outside source, the user of that computing device will want to be assured that the outside source can be trusted. Because each challenge is signed with a private key specifically available only to the game server, and each game released for use in conjunction with the game server (or the game console) includes the corresponding public key, the user of the game console can be assured that the executable code received from the game server is coming from a trusted source. In a block 350, parameters for each challenge can be assigned to generate additional challenges, and answers for each challenge, and each challenge modified by such parameters are defined.

Referring once again to block 358, the game console attempts to log on to the game server. In response, the game server selects one of the pre-authored challenges, and a set of parameters in a block 360. In a block 362, the game server sends the signed challenge to the game console. In a block 364, the game console uses the public key included in the memory on the game console to verify that the signature from the game server is authenticated, before executing the challenge sent to the game console from the game server. Preferably, if the signature does not authenticate with the public key, the challenge code is not executed. However, the fact that the signature check failed is quietly sent back to the server as part of the response. The reason for doing this is because failure to properly authenticate the signature on the challenge code usually signifies the presence of a modified BIOS (i.e., that the public key was modified), and this result should be considered an incorrect response, just like any other response that does not match the expected response. In a block 366, the game console executes the code with the parameters included in the challenge to compute a response. In a block 368, the game console sends the computed response to the game server.

In a decision block 370, the game server evaluates the response from the game console and determines whether the response matches an expected response. The expected response is determined by the specific challenge that was selected in block 360. Thus, the server needs to keep track of the specific challenge that was selected between block 360 and block 370. If no response is received from the client, the server will treat the lack of response as if it had received an incorrect response from the client. However, due to the possibility that the client might have been involuntarily disconnected from the server at that precise instance in time, it is preferable to give the client the benefit of the doubt until several instances of no response have been encountered. While not indicated in the flow chart, the server can enumerate all consecutive instances of failing to respond to a challenge by a specific client, so that if the client has failed to respond a predefined number of times, a predefined action will be taken by the server. In a block 374, the game server has determined that the game console has provided the expected response, and the game console is logged on to the game server, enabling the game console user to experience the benefits of network game play.

An optional logical step is indicated by decision block 376, in which the game server determines at some point during game play whether a new challenge should be issued to the game console. If no new challenge is to be issued, the logical process ends. If it is determined that a new challenge should be issued, the logic loops back to a block 360 and a new challenge is sent to the game console from the game server. At this time, it is not believed that a user can switch from one configuration to an alternative configuration during game play without a system reboot. However, if work-arounds are developed to enable configurations to be hot swapped during game play, such a work-around could be defeated by sending challenges randomly during a game play session to detect any modification to the game or game console configuration. Referring once again to decision block 370, if the game server determines that the game console has returned an incorrect response, then the game server executes a predefined action in a block 372. Once the predefined action is executed, the logical process is over.

In a preferred embodiment, the predefined action is to immediately disable the logical connection between the game console and the game server. Further, the game server preferably records the identification of the game console that has been denied access, and refuses to accept any future log on attempts from that specific game console. This approach is expected to be a particularly effective in dissuading users from modifying their game console, even if the modification includes a switch enabling them to selectively configure their game console in either an original configuration, which would pass a challenge, or an alternate modified configuration. It is expected that a frequent user of the game server will at some point forget to properly position such a switch in the original configuration position. Any such mistake would result in the permanent ban of that game console from accessing the game server. It should be understood, however that other predefined actions can be executed. For example, the game server may merely log the incidences of modified game consoles attempting to gain access to the game server for a period of time, to determine the extent of modified consoles being used on the network. The game server could issue one or more warnings to the user of the game console that access by modified consoles is not allowed, before permanently banning the game console from the game server. After receiving such a warning, the game console user could permanently return the game console to its original configuration, and thereafter access the game server.

Although the present invention has been described in connection with the preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

We claim:

1. A method for determining whether a client is authentic and permitted to participate in a network-enabled service provided by a server, the method comprising:

maintaining at a server a plurality of challenges, each of said plurality of challenges being a server-based challenge usable by the server to detect one or more modifications on a client device that allow a user of the client device to cheat when playing the at least one online game;

receiving a request from the client device to participate in a particular network-enabled online game;

selecting a one of the challenges and transmitting the challenge to the client gaming device, the challenge including encoded machine executable instructions that, when executed by the client device, cause the client device to compute a response to the challenge, the response being related to and indicative of either the lack or existence of the one or more modifications on the client device;

receiving the response from the client device;

analyzing the response to determine whether the response received from the client matches an expected response indicative that the client device has not been modified to allow the user to cheat in the at least one online game;

when the response received from the client device does not match the expected response for a client device that has not been modified, denying the request from the client and identifying the client as a device which is to have all future requests denied, thereby preventing the client from future play of the network enabled online game.

2. A method as recited in claim 1, wherein denying the request from the client further includes terminating a logical connection between the client and the server.

3. A method as recited in claim 1, wherein analyzing the response includes determining that the response is correctible by the client to match the expected response.

4. A method as recited in claim 1, wherein all future requests from the client are denied by denying the client any future connection to the server.

5. A method as recited in claim 1, wherein all future requests from the client are denied by ignoring all future requests from the client.

6. A method as recited in claim 1, further comprising:

when the response received from the client does not match the expected response, denying the request from the client and obtaining an identity of the user causing the client to make the request, and identifying the identity of the user as a user who is to have all future requests denied.

7. A method as recited in claim 1, wherein selecting one of the challenges includes selecting a server-based challenge from among a plurality of available server-based challenges maintained by the server, wherein each of the server-based challenges include code segments that, when executed by the client device, cause the client device to identify to the server whether a condition on the client device exists.

8. A method as recited in claim 1, wherein the client device is a dedicated gaming device.

9. A method as recited in claim 3, further comprising:

after determining that the response can be corrected by the client to match the expected response, and before denying the request from the client, sending a subsequent server-based challenge to the client; and receiving a second response from the client.

10. A method as recited in claim 7, wherein selecting a code segment representing a server-based challenge which may be used by the server to detect a condition on the client device includes selecting a server-based challenge which may be used to detect the presence of software on the client device which allows the user of the client device to cheat in the particular network enabled online game.

11. A method as recited in claim 7, wherein selecting a code segment representing a server-based challenge which may be used by the server to detect a condition on the client includes selecting a server-based challenge which may be used to detect the presence of hardware on the client device which allows the user of the client device to cheat in the particular network enabled online game.

12. A method as recited in claim 7, wherein selecting a code segment representing a server-based challenge which may be used by the server to detect a condition on the client device includes selecting a server-based challenge which may be used to detect the presence of modifications to the BIOS on the client device, thereby allowing the user of the client device to cheat in the particular network enabled online game.

13. A method as recited in claim 7, wherein selecting a code segment representing a server-based challenge which may be used by the server to detect a condition on the client device includes selecting a server-based challenge which may be used to detect the use of a pirated copy of gaming software on the client device.

14. A method as recited in claim 9, further comprising:

when the second response from the client matches an expected response to the subsequent challenge, fulfilling the request from the client; and when the subsequent response from the client does not match the expected response to the subsequent challenge, denying the request from the client and identifying the client as a device which is to have all future requests denied.

15. A method for determining when a client gaming device has been modified to allow a user to cheat during online game play by issuing challenges that check for cheat modifications, the method comprising:

maintaining, at a server that includes a network game service hosting at least one online game, a plurality of challenges, each of said challenges being a server-based challenge usable by the server to detect one or more modifications on a dedicated client gaming device that allow a user of the dedicated client gaming device to cheat when playing the at least one online game;

at the server, selecting one of the challenges and transmitting the challenge to the dedicated client gaming device, the challenge including encoded machine executable instructions that, when executed by the dedicated client gaming device, cause the dedicated client gaming device to compute a response to the challenge, the response being related to and indicative of either the lack or existence of the one or more modifications on the dedicated client gaming device;

receiving the response from the dedicated client gaming device;

analyzing the response by comparing the response to a response expected for a dedicated client gaming device that has not been modified to allow the user to cheat in the at least one online game; and when the response to the challenge does not match the response expected for a dedicated client gaming device that has not been modified, determining that the dedicated client gaming device has been modified to allow the user to cheat in the at least one online game and terminating a connection of the dedicated client gaming device to the server, and further;

storing an identity of the dedicated client gaming device; and when one or more subsequent requests from the dedicated client gaming device are received, denying all subsequent requests from the dedicated client gaming device matching the stored identity of the dedicated client gaming device device, thereby permanently blocking the dedicated client gaming device from participating in the at least one online game.

16. A method as recited in claim 15, wherein the challenge further includes at least one parameter designating a specific location of storage space to check for modifications, the designated specific location of storage space being located in one or both of memory of the dedicated client gaming device or a removable storage device used to execute the at least one online game.

17. A method as recited in claim 15, further including:

when the response to the challenge matches the response expected for a dedicated client gaming device that has not been modified, accepting the response and allowing the user of the dedicated client gaming device to participate in the at least one online game.

18. A memory medium having machine instructions for implementing the method of claim 15.

19. A method as recited in claim 16, wherein the challenge instructs the dedicated client gaming device to compute a hash of contents of the specific location of storage space.

20. A method as recited in claim 17, wherein allowing the user of the dedicated client gaming device to participate in the at least one online game includes creating a session with the client, and wherein accepting the response further includes:

during the session with the client, selecting a subsequent server-based challenge and sending the subsequent server-based challenge to the dedicated client gaming device;

from the client, receiving a response to the subsequent server-based challenge; and analyzing the response to the subsequent server-based challenge to determine if the dedicated gaming device has been modified since creation of the session to allow the user to cheat in the at least one online game.

\* \* \* \* \*